No. 678,977. Patented July 23, 1901.
J. C. REED.
MOLDING APPARATUS.
(Application filed Sept. 18, 1899. Renewed Dec. 26, 1900.)
(No Model.) 2 Sheets—Sheet 1.

Witnesses
George Lane
Geo. M. Copenhaver

John C. Reed
Inventor
by Connolly Bros
Attorneys

THE NORRIS PETERS CO., PHOTO-LITHO., WASHINGTON, D. C.

No. 678,977. Patented July 23, 1901.
J. C. REED.
MOLDING APPARATUS.
(Application filed Sept. 18, 1899. Renewed Dec. 26, 1900.)
(No Model.) 2 Sheets—Sheet 2.
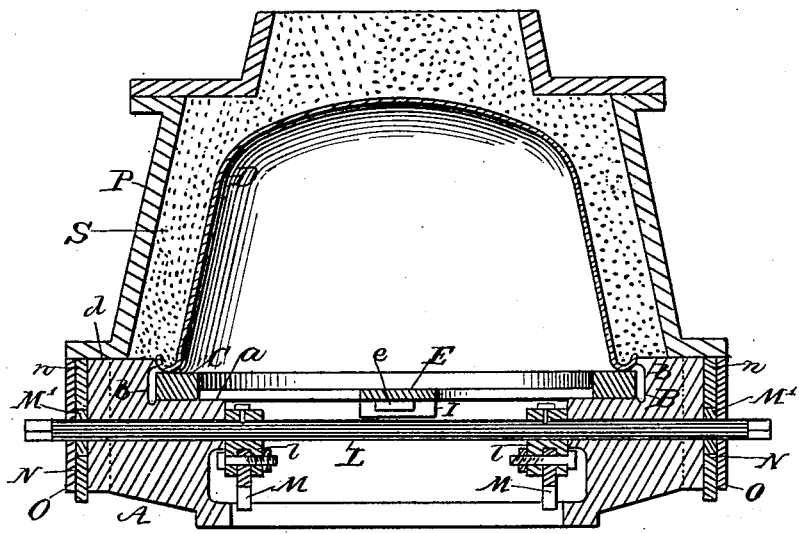
Fig. 3.
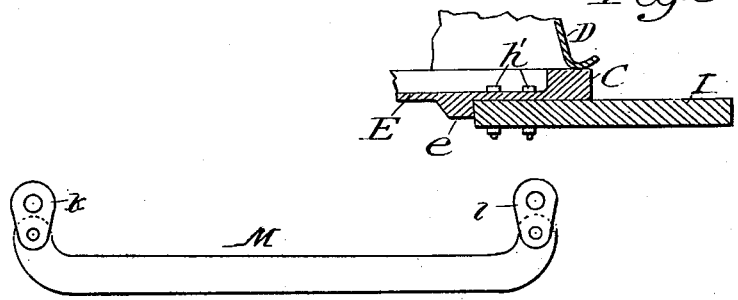
Fig. 5.
Fig. 4.
John C. Reed
Inventor
by Connolly Bros.
Attorneys
Witnesses
George Lane
Geo. M. Copenhaver

UNITED STATES PATENT OFFICE.

JOHN C. REED, OF ALLEGHENY, PENNSYLVANIA.

MOLDING APPARATUS.

SPECIFICATION forming part of Letters Patent No. 678,977, dated July 23, 1901.

Application filed September 18, 1899. Renewed December 26, 1900. Serial No. 41,093. (No model.)

*To all whom it may concern:*

Be it known that I, JOHN C. REED, a citizen of the United States, residing at Allegheny, in the county of Allegheny and State of Pennsylvania, have invented certain new and useful Improvements in Molding Apparatus; and I do hereby declare the following to be a full, clear, and exact description of the invention, such as will enable others skilled in the art to which it appertains to make and use the same.

My invention has relation to molding apparatus, and relates in particular to apparatus for molding comparatively large and heavy hollow castings, such as bath-tubs.

My invention has for its object the provision of novel means for forming the cheek and cope part of the mold and for separating the molded sand from the pattern upon which it has been molded with neatness and despatch and without danger of marring or destroying the mold.

My invention consists in the novel construction, combination, and arrangement of parts hereinafter described and claimed.

Figure 1:
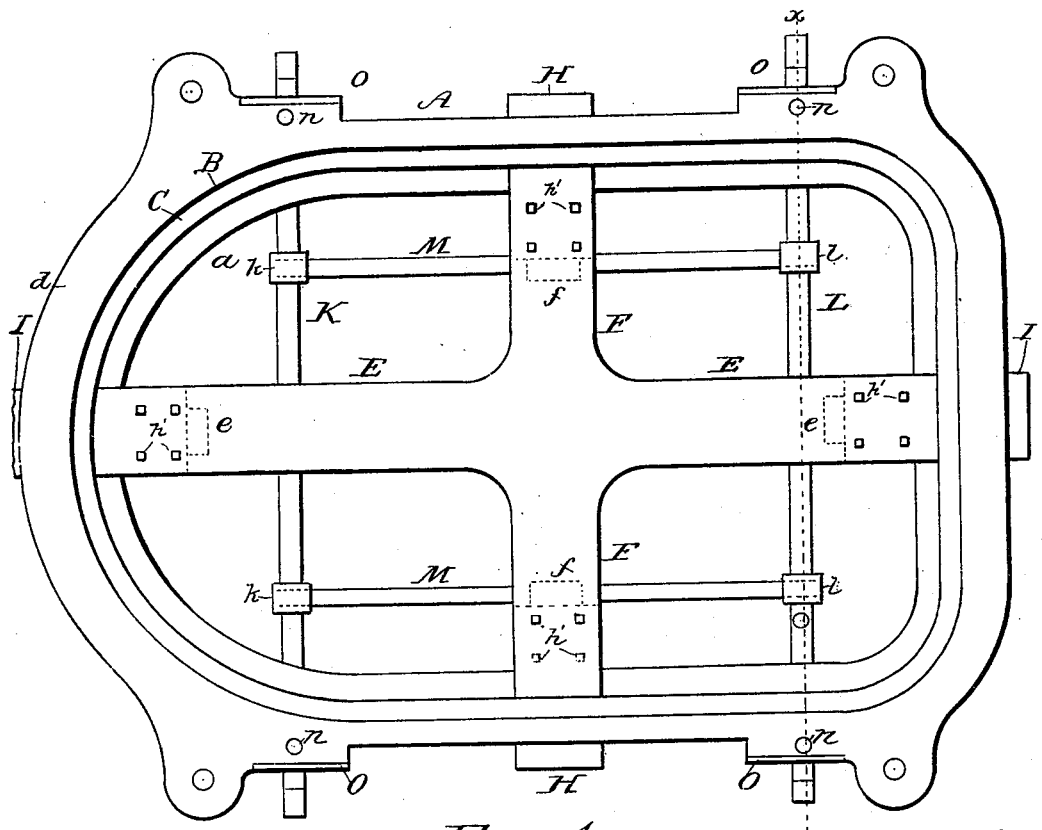
Figure 2:
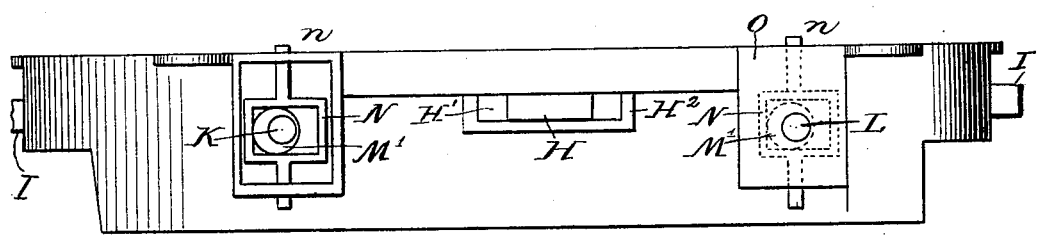

Referring to the accompanying drawings, Figure 1 is a plan view of my improved molding apparatus. Fig. 2 is a side elevation of the same. Fig. 3 is a vertical sectional view on the line $a\,x$ of Fig. 1. Fig. 4 is a plan view of a detached part of the apparatus. Fig. 5 is a detail view in section of part of the jarring devices.

A designates the main frame or base of the apparatus, composed of a heavy casting having parallel sides and rounded ends and a hollow central portion containing the pattern supporting and lifting devices, hereinafter described. A cavity or depression B in the base A corresponds to the exterior contour of the article to be cast, and a frame C fits within said depression, resting on a ledge $a$. The sides of the cavity or depression are cut away, as shown at $b$, to permit of a slight longitudinal and lateral movement of the frame C upon the ledge $a$.

D designates the pattern, which corresponds on its exterior surface to the exterior surface of the casting which is to be formed in the mold when the latter is completed, which in this instance is a bath-tub having a rounded rim. The pattern D is securely attached to the frame C, and the latter is of such a depth that the curve of the rim of the pattern extends up to the upper surface of the frame A, so that the upper surface $d$ of the frame forms the parting of the mold. The frame C is cast integral with longitudinal and lateral cross-bars E and F, which have lugs $e$ and $f$ on their lower sides, against which the ends of stout jarring or striking bars or blocks H I bear, the latter being firmly bolted by bolts $h'$ to the cross-bars E F and projecting through holes H' (said holes being edged by flanges $H^2$) in the sides and ends of the frame A, these bars H and I being adapted and intended to be struck on their projecting ends to communicate a jarring or vibratory motion to the frame C and through it to the pattern D, so as to facilitate the separation of the pattern from the sand.

Shafts K L pass through the frame A from side to side and have squared projecting ends, and hangers $k\,k$ on the shaft K are connected with similar hangers $l\,l$ on the shaft L by pitman-bars M, so that any rotary motion given to either of the shafts will be communicated to the other.

Upon each end of the shafts K L and outside of the frame A are attached cams M' M', which work within yokes N N, that have upwardly-extending pins $n\,n$, which in one position of the cams M M are flush with or below the surface of the frame A and in another position of the cams project above such surface. Suitable caps O O cover the cams, the ends of the shafts L K projecting through the caps, as shown.

P designates the flask, which rests upon the flat surface $d$ of the frame A, and S the sand which is packed within the flask in the usual manner.

Operation: The base A being placed in position on the ground, the flask P is lowered over the pattern and filled with sand, which is packed and rammed in the usual manner. When the flask is filled, the jarring-bars H I are struck a number of blows with a heavy hammer, which has the effect of communicating a jarring or vibratory motion to the pattern, that effects the speedy and even separation of the sand from the entire surface of the pattern. After the pattern has been jarred sufficiently the shafts K and L are turned, and the cams M' M', turning in the yokes N N, cause the pins $n\ n$ to rise and gradually and evenly elevate the flask and its contained sand from the pattern and from the base A. When the flask has been elevated in this manner a sufficient distance to obviate all danger of displacement or defacement of the molded sand, which would be sure to ensue if the flask were moved horizontally while the sand was in contact with the pattern, it is elevated by the usual lifting apparatus and conveyed away and another flask placed in position over the pattern and the operation repeated as before.

As the jarring or striking bars H I are apt to become battered and broken from the impact of the hammers used in striking their ends, they are made separate from the frame C and attached to the same by bolts, so that they may be removed and replaced by new bars when necessary.

Having described my invention, I claim—

1. In a molding apparatus, a hollow flask-supporting base A, having a cavity or depression B corresponding to the exterior contour of the pattern and formed with a depressed ledge $a$, a frame C, resting loosely on said ledge and separated at its sides and ends from the vertical walls of said depression so that it may be vibrated therein, a pattern attached to the upper surface of said frame and a vibrating or jarring device secured to said frame and comprising bars which extend laterally and longitudinally beyond said frame and are provided with removable end pieces to receive the impact of a sledge or mallet.

2. In a molding apparatus the combination of a base having a central depression formed with a ledge, a flask supported on said base, a vibratable pattern-supporting frame resting upon said ledge, a pattern rigidly secured to said frame and a jarring or vibrating device attached to said frame and comprising laterally and longitudinally extending bars projecting beyond the edges of the frame and provided with detachable end extensions to receive the impact of a hammer or mallet, substantially as described.

3. In a molding apparatus the combination of a stationary flask-supporting base, a vibratable frame resting on said base, a pattern secured to said frame and a vibrator or agitator comprising a central spider made integral with the frame and having laterally-extending detachable striking or jarring bars, substantially as described.

4. In a molding apparatus, the combination with the hollow base A, having depression B and ledge $a$ of the frame C having cross-bars E F, pattern D attached to the frame and the striking or jarring bars H, I, also attached to the frame and extending through the sides and end of the base A substantially as described.

In testimony whereof I have affixed my signature in presence of two witnesses.

JOHN C. REED.

Witnesses:
JOSEPH B. CONNOLLY,
HUMPHREY LYNCH.